US006998751B2

(12) United States Patent
Lopatinsky et al.

(10) Patent No.: US 6,998,751 B2
(45) Date of Patent: Feb. 14, 2006

(54) HIGH RELIABILITY ELECTRIC DRIVE

(75) Inventors: Edward Lopatinsky, San Diego, CA (US); Lev Fedoseyev, El Cajon, CA (US); Saveliy Rosenfeld, San Diego, CA (US); Daniel Schaefer, Palm Desert, CA (US)

(73) Assignee: Rotys Inc., San Diego, CA (US)

( * ) Notice: Subject to any disclaimer, the term of this patent is extended or adjusted under 35 U.S.C. 154(b) by 26 days.

(21) Appl. No.: 10/940,257

(22) Filed: Sep. 14, 2004

(65) Prior Publication Data

US 2005/0057112 A1 Mar. 17, 2005

Related U.S. Application Data

(60) Provisional application No. 60/503,441, filed on Sep. 16, 2003.

(51) Int. Cl.
*H02K 3/04* (2006.01)
(52) U.S. Cl. .................. 310/208; 310/179; 310/254
(58) Field of Classification Search ............ 310/179, 310/180, 184, 208, 216, 254
See application file for complete search history.

(56) References Cited

U.S. PATENT DOCUMENTS

| 5,334,899 A | * | 8/1994 | Skybyk ..................... 310/268 |
| 5,646,464 A | * | 7/1997 | Sickafus ................ 310/40 MM |
| 2003/0020353 A1 | * | 1/2003 | Lopatinsky et al. ........ 310/208 |
| 2003/0048013 A1 | * | 3/2003 | Lopatinsky et al. .......... 310/52 |
| 2004/0245866 A1 | * | 12/2004 | Lopatinsky et al. .......... 310/64 |

\* cited by examiner

*Primary Examiner*—Thanh Lam

(57) ABSTRACT

An electric drive comprising a stator with at least two ring-shaped windings and controllers, and a magnetized rotor with an axis of rotation. Each of said windings comprises at least one coil layer with circumferentially arrayed coils located around said axis, and a layer of electro-insulating material, and each winding is electrically connected to a power source through an individual controller. At least two said windings are electrically connected by their controllers in parallel, with the possibility to function jointly and/or independently. At least two nearest windings are located in such a way that two said coil layers belonging to the different windings are separated by an additional layer of electro-insulating material. The coils of said nearest coil layers of different windings are made the same in transparent view, so that the distances between corresponding parts of said coils of said nearest windings are equal to the thickness of said additional layer of an electro-insulating material. At least two said nearest windings are made as parts of a common multi-layer printed circuit board.

16 Claims, 9 Drawing Sheets

HIGH RELIABILITY ELECTRIC DRIVE

CROSS-REFERENCE TO RELATED APPLICATIONS

The present application claims the benefit of priority of U.S. Provisional Patent Application No. 60/503,441 filed Sep. 16, 2003 for Edward Lopatinsky et al., the entire content of which is incorporated herein by reference.

BACKGROUND OF THE INVENTION

The present invention relates generally to electric drives and is useful in direct current brushless motors.

It is desirable to have small overall dimensions and high reliability in electric drives. These requirements are especially important for electric drives operating in cooling systems with blower and heatsink for regulating the temperature of electronic devices. The trend toward smaller and thinner electronic devices having faster processors renders traditional heat removal cooling systems inadequate. It is desirable that the electric drives of these systems be small, thin and efficient as well.

At the same time the electric drives should have high reliability, since the failure of the electric drives of said cooling systems could cause electronic devices to malfunction during use, or lead to premature device failure.

The best method for increasing the reliability of such systems is to incorporate redundancy of their parts. In particular, such electric drives often have (as described, for example, in the patent application WO No 94/14226) additional reserve stator windings, which work in case of failure of one or more of the main windings. Normally providing higher reliability by providing redundancy increases overall sizes of the electric drives.

Many types of electric drives comprise a magnetic rotor and a stator with coils wrapped about some cylindrical core are known, but such electric drives are not compact enough.

There is known an electric drive with coils wrapped about some ring-shape core, as described in U.S. Pat. No. 5,440,185. This device incorporates a magnetic rotor and a stator with coils wrapped about ring-shape disk.

There is known an electric drive described in U.S. Pat. No. 4,645,961, "Dynamoelectric machine," composed of a magnetic rotor and a stator with the winding made as a cylindrically shaped ring, wherein said stator incorporates additional circumferentially placed printed circuit coils that form two coil layers made as parts of a common printed circuit board. Said coils of the different layers are electrically connected and form together a ring-shaped winding, the two said coil layers of which are separated by a layer of an electro-insulating material.

There is known an electric drive described in the patent application WO No 03/003547 A1 (PCT/U.S. Pat. No. 02/20224) "Brushless DC Electric Motor" composed of a magnetic rotor and a stator with two windings made as disk rings located around a common axis on opposite sides from the rotor, wherein each of said windings incorporates circumferentially placed printed circuit coils that form two coil layers made as parts of a common printed circuit board and located on opposite sides of an electro-insulating layer. Said coils of different layers are electrically connected, forming together a ring-shaped winding. Both windings are the main windings, and operate together during normal operation.

The above mentioned electric drives with ring-shaped windings are the most compact from all known electric drives. But reliability improvements realized without using additional reserved winding(s), as well as efficiency improvements, could additionally decrease the sizes of such devices.

It would be generally desirable to provide an electric drive that has higher reliability without using reserved windings. This would decrease device sizes and at the same time provide the benefit of higher efficiency that can yield higher rotation speed and the possibility of additional decreasing its overall sizes.

SUMMARY OF THE INVENTION

According to the present invention, an electric drive comprises a stator with at least two windings and controllers, and a magnetized rotor with an axis of rotation, each of said windings comprises at least one coil layer with circumferentially arrayed coils located around said axis and a layer of electro-insulating material, and each winding is electrically connected to a power source through its own individual controller.

The general concept of the claimed invention is that at least two said windings are electrically connected by their individual controllers in parallel, with the possibility to function jointly and/or independently, and at least two nearest windings are located in such a way that two said coil layers belonging to the different windings are separated only by an additional layer of electro-insulating material. The thickness of said layer necessary for electro-insulating of coil layers is very small. Thus the coil layers of said nearest windings are located at a very small distance from each other, equal simply to the thickness of said additional insulating layer. As the tests show, in this case there is a desirable effect: the efficiency of an electric drive with such closely spaced electrically coupled windings is higher than in known electric drives. This design yields higher rotation speed with the same amount of energy, or requires a lower amount of energy while yielding the same rotation speed—all without the increasing the volume. Or the electric drive can be made smaller because of higher efficiency and more compact arrangement of windings. Connecting said windings in parallel, and allowing the possibility of joint and/or independent functioning, provides the option to employ all windings together until such time as one of them may fail to function, then using the remaining winding(s) for driving the rotor after of one of them failed. Employing the stated design, the reliability of this electric drive is enhanced without using reserved windings, and thus without increasing its size. There are different variants available depending on the actual application. For example, the electric drive can operate with less power until replacement of the disabled winding occurs, or power can be increased to the previous level by employment of at least one variable power source. The combination of all such features of the present invention provides the smallest sizes for an electric drive when compared with all other known electric drives.

According to the first embodiment of the present invention, the coils of said nearest coil layers of different windings are made the same in transparent view, so that the distances between corresponding parts of said coils of said nearest windings are equal to the thickness of said additional layer of an electro-insulating material. In this case the electric drive has the maximum efficiency.

In the next embodiment of the present invention, each of said windings is made as a printed circuit board with printed coils.

According to the next variant in this case, said coils are etched in circuit board metal layers.

In the next embodiment, at least two said nearest windings are made as parts of a common multi-layer printed circuit board.

According to the next variant, each of said windings comprises two electrically connected coil layers located on opposite sides of said layer by an electro-insulating material, and thus said common multi-layer printed circuit board is composed of at least four coil layers.

In the next variant, each of said coil layers forming common winding comprises circumferentially arrayed pairs of spiral coils. Said coil layers are made with the same sizes and configurations of coils and are shifted angularly so that the center of the start coil of each said pair of coils from one side of said layer of an electro-insulating material is electrically connected with the center of the end coil of each said pair of coils on the other side of said layer of electro-insulating material.

According to the next variant, said coil layers forming common winding are electrically connected by internal vias, which are reach-through holes plated with high electro-conducting material forming a cylinder around each said via.

According to the next embodiment, each said cylinder from high electro-conducting material is located in contact with coils of two coil layers of the same winding, and is electrically isolated from remaining coils so that each said via connects only two said layers of the same winding, and each place for connecting respective pairs of coils of different layers has a number of said vias equal to the number of windings forming said multi-layer printed circuit board. It is typically very difficult, and even sometimes impossible, to make connections between coil layers in printed circuit boards having many coil layers with cylindrical hollows. Said proposed embodiment is new, and represents a highly significant design enhancement by providing the possibility to fabricate a multi-layer printed circuit board with more than two coil layers and with reach-through vias connecting only needed pairs of coil layers. Said multi-layer printed circuit board can be made by connecting all the windings and insulating layers, and following making said reach-through vias that is not difficult.

In the next embodiment, the electric drive further comprises at least two groups of windings located on the opposite sides of said rotor, each of said groups comprises at least two windings, and in each of said groups coil layers belonging to different windings are separated by an additional layer of electro-insulating material.

According to the next embodiment, said power source is made variable, with the possibility to change the power for the remaining said windings when at least one of them cannot continue to develop the full power necessary for normal work of the electric drive. This allows the possibility to provide the power necessary for continuation of normal work of the electric drive after at least one of the windings has failed, increasing reliability of the electric drive without additional reserved winding(s).

The most effective variation occurs when all said windings are made identical (with the same sizes and configurations of their coils), so that they consume the same power. In case of failure of any one of them, full design power should nevertheless be drawn on the same volume.

In the next embodiment, all said windings are connected by their controllers to a single common power source.

In the next variant, each of said windings is connected by its controller to an individual power source. This additionally increases reliability of the system.

The next embodiment incorporates a method of using said electric drive including permanent turning on of all said windings, and working with less than full design power when one of said windings cannot continue to operate until it has been replaced.

Next is the method of using of said electric drive with windings connected by their controllers with said variable power source (power sources). This includes permanent turning on of all said windings and increasing power to the remaining said windings when at least one of them cannot continue to operate at the design power necessary for normal functioning of the electric drive.

DETAILED DESCRIPTION OF THE INVENTION

Claimed invention will be described in detail below with reference to the accompanying drawings. FIGS. 1–9 show embodiments of the present invention.

Figure 1:
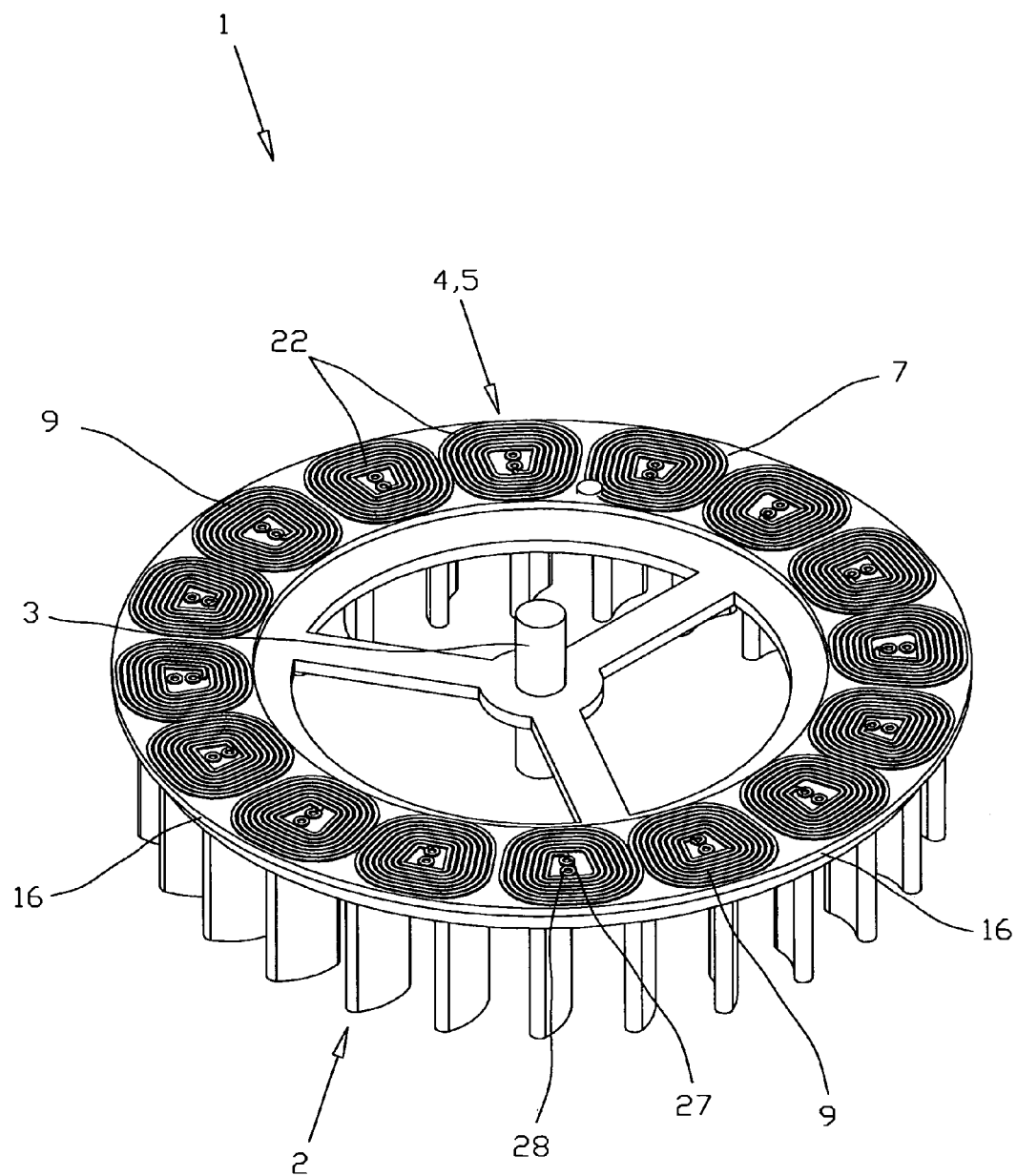
FIG. 1 is a perspective view showing the first embodiment of the electric drive according the present invention (without controllers and power source).
Figure 2:
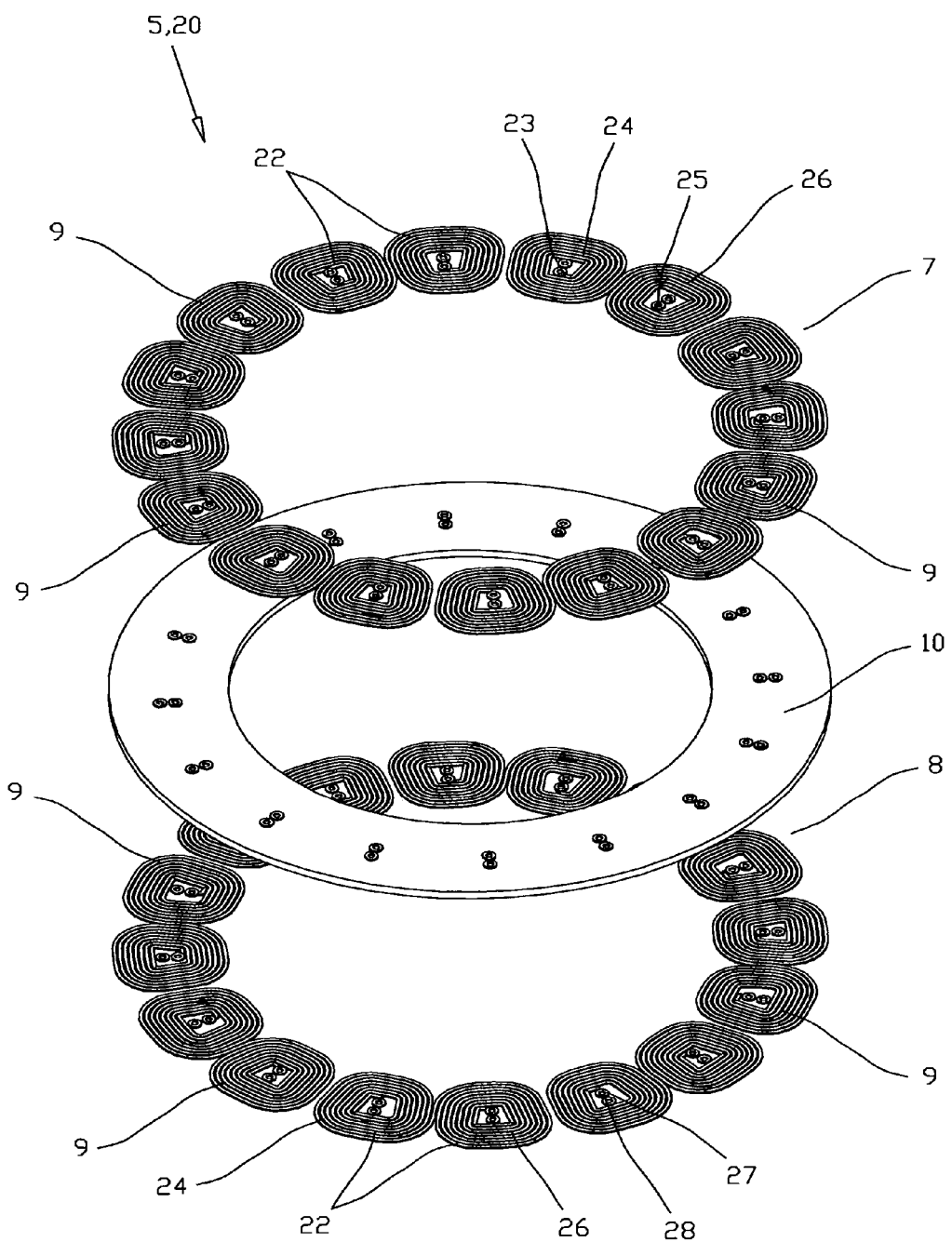
FIG. 2 is an exploded view showing one stator's winding of the electric drive.
Figure 3:
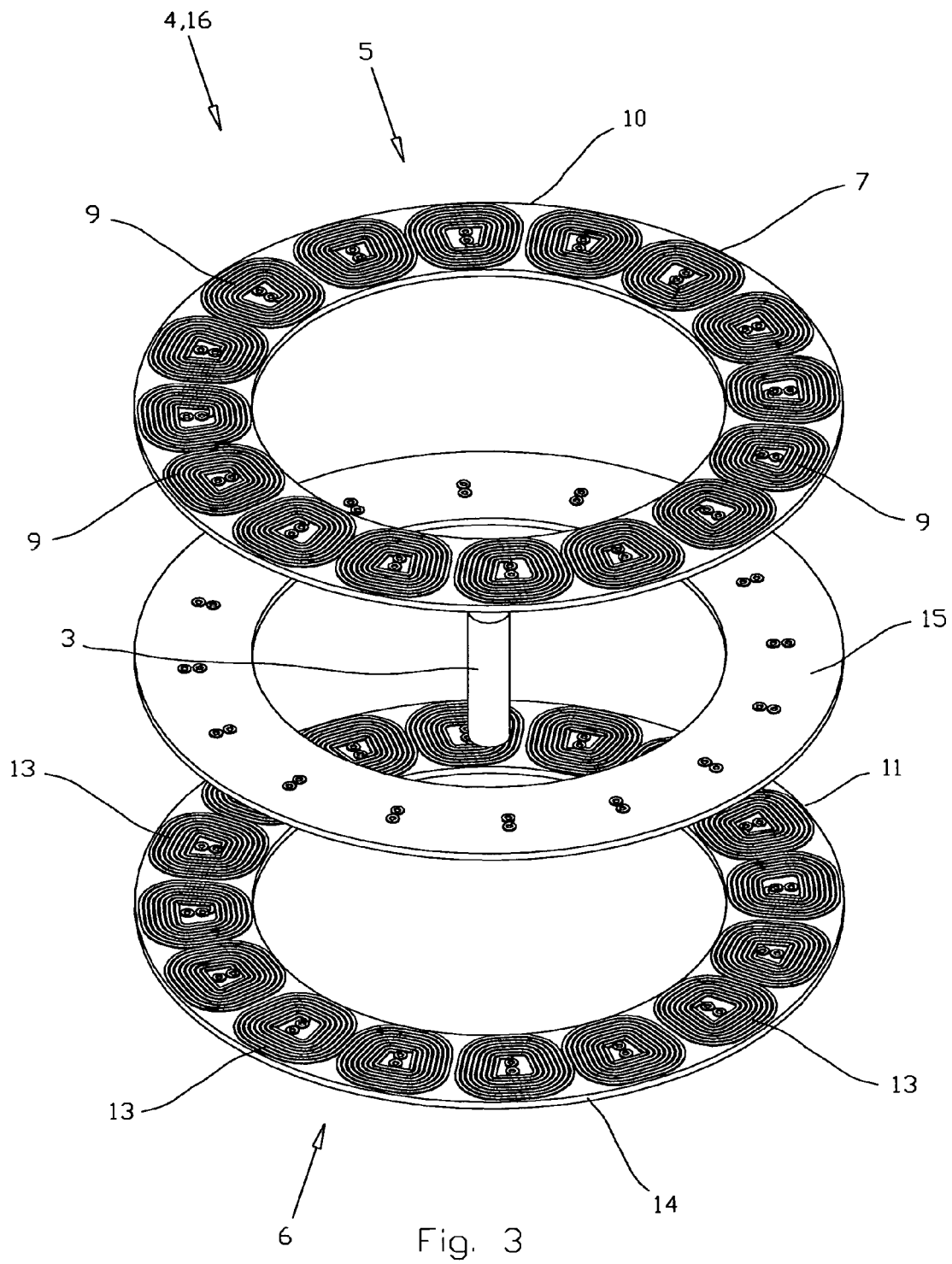
FIG. 3 is an exploded view showing the multi-layer circuit board formed by two windings of the electric drive, with rotor's axis. Layers of each winding are shown together (not exploded).
Figure 4:
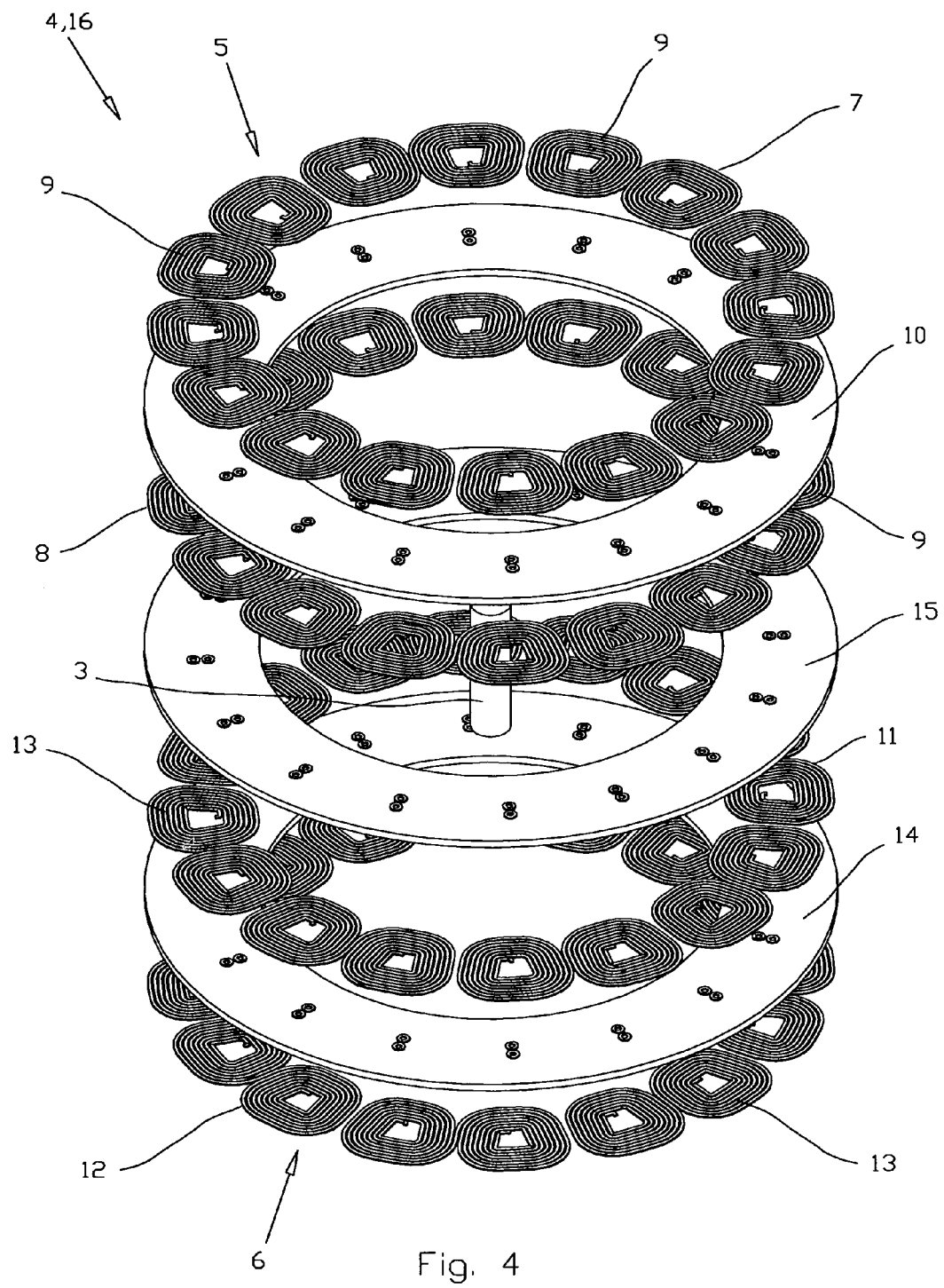
FIG. 4 is an exploded view showing the same multi-layer circuit board formed by two windings, with layers of each winding shown separated (for simplification, vias are not shown on coil layers).
Figure 5:
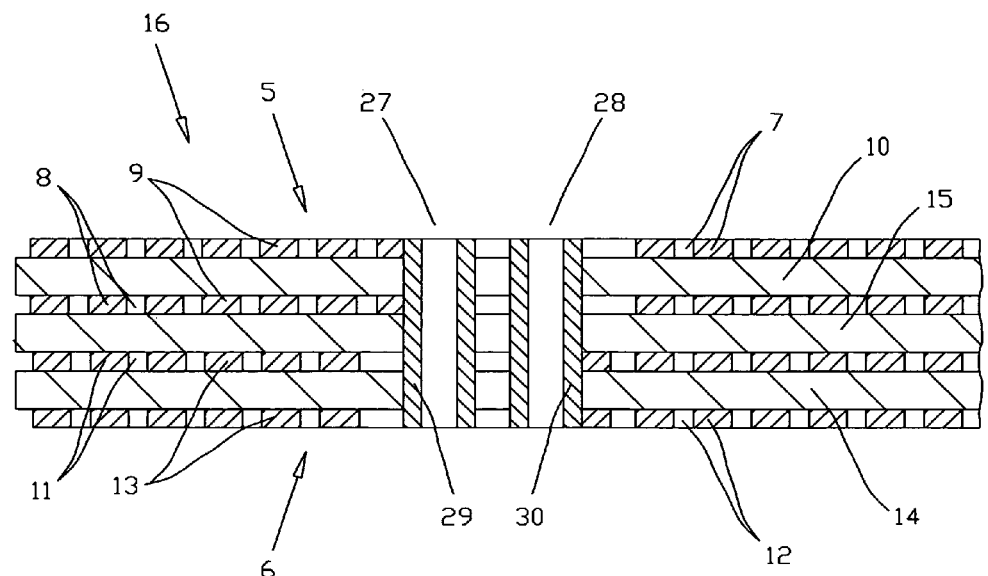
FIG. 5 is a partial, cross-sectional view of said multi-layer circuit board formed by two nearest windings.
Figure 5A:
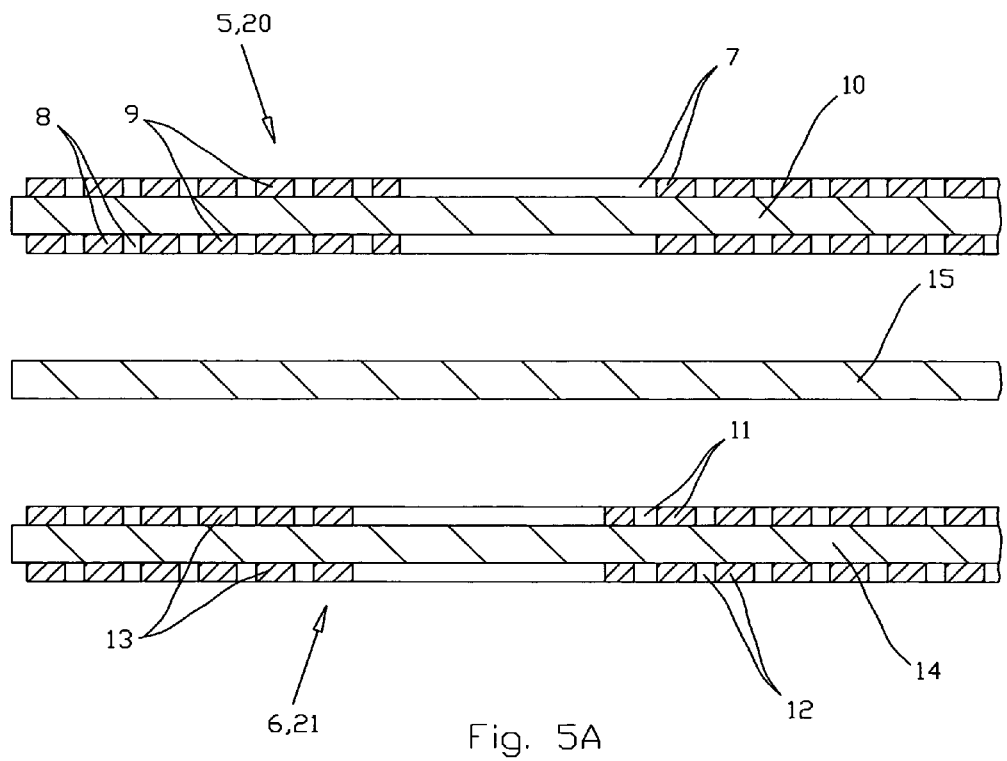
FIG. 5A is a partial, cross-sectional view of two circuit boards formed by two nearest windings with an additional layer of electro-insulating material before connecting them in one common multi-layer circuit board.
Figure 6:
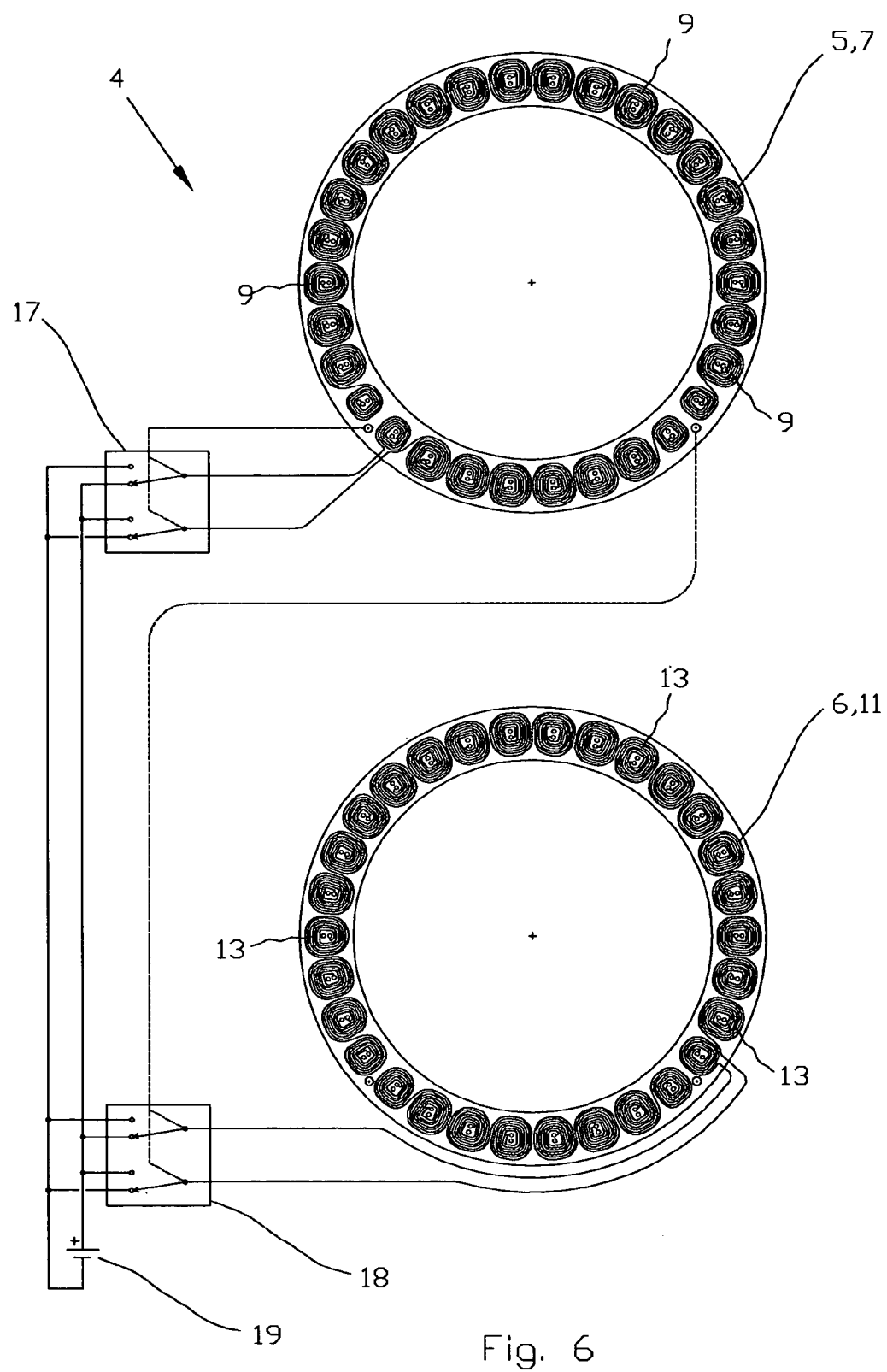
FIG. 6 illustrates the set of the top views of two windings with their communications (controllers and power source).
Figure 7:
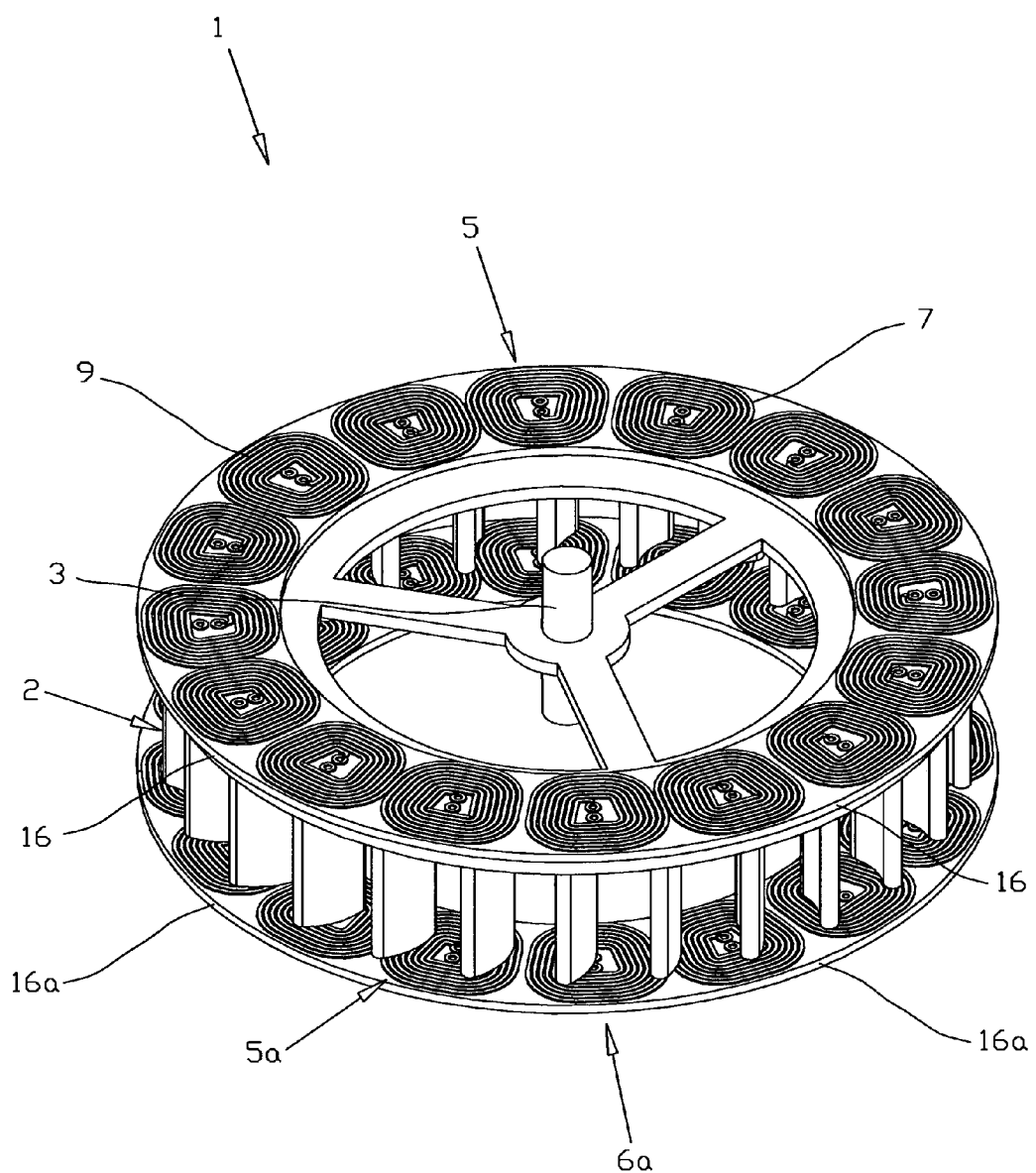
FIG. 7 is a perspective view showing the second embodiment of the electric drive according the present invention, when it has two groups of windings located on opposite sides of rotor.
Figure 8:
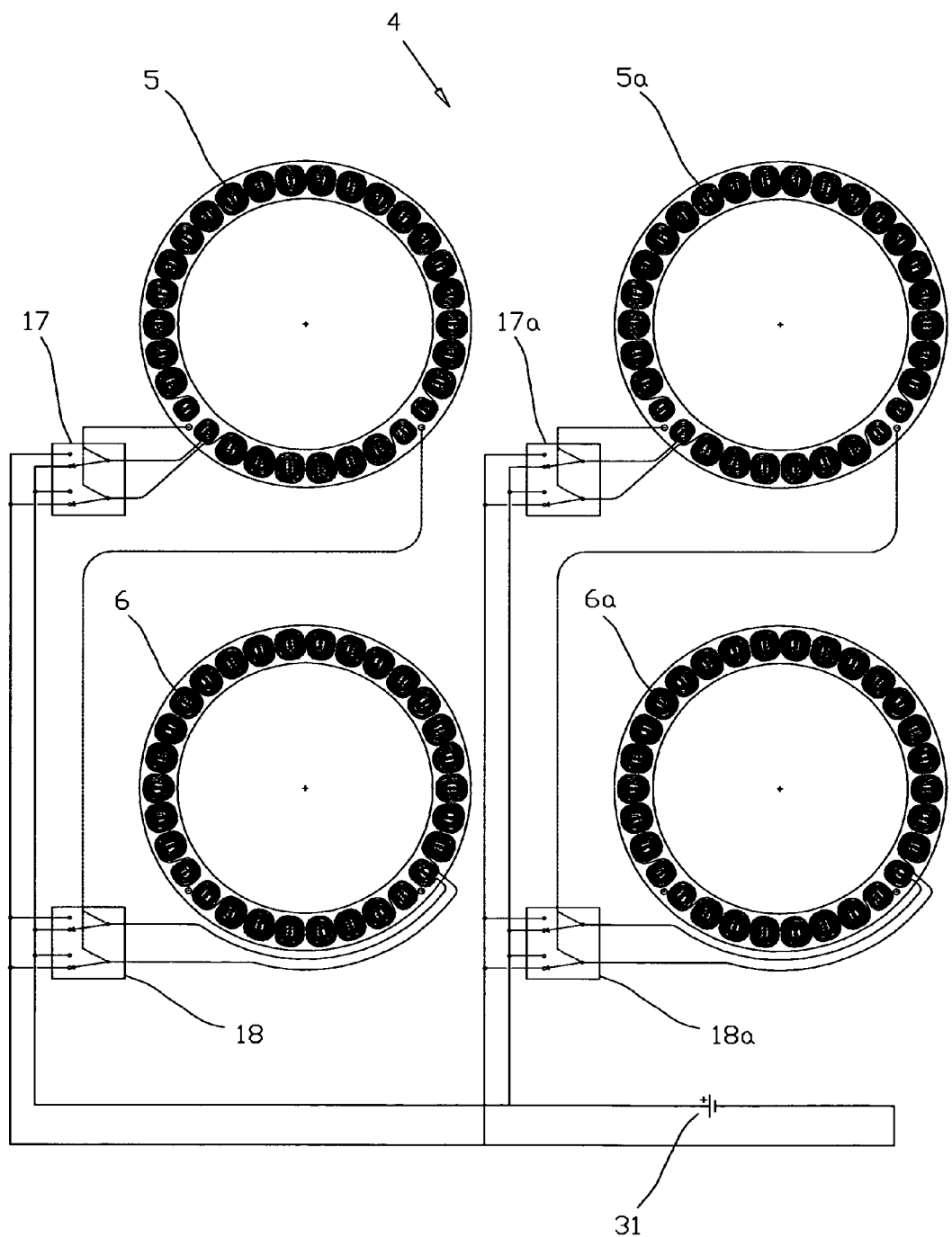
FIG. 8 illustrates the set of the top views of the windings with their communications in said second embodiment of the invention (incorporating four windings)—with one common power source.

In FIGS. 1–6, an electric drive 1 comprises a magnetic rotor 2 with an axis of rotation 3 and a stator 4 having two ring-shaped windings 5 and 6. Each of said windings 5 and 6 comprises two coil layers: winding 5 has electrically connected coil layers 7 and 8 with plurality of circumferentially-arrayed printed coils 9 located around said axis 3 and a layer of electro-insulating material 10 between layers 7 and 8. Winding 6 has electrically connected coil layers 11 and 12 with plurality of circumferentially arrayed printed coils 13 located around said axis 3 and a layer of electro-insulating material 14 between coil layers 11 and 12. Windings 5 and 6 are located in such a way that two coil layers 8 and 11 belonging to the different windings, accordingly 5 and 6, are separated only by an additional layer 15 of electro-insulating material. Said windings 5 and 6 are fabricated as parts of a common multi-layer printed circuit board 16. The stator 4 comprises also controllers 17 and 18, and the windings 5 and 6 are electrically connected with a power source 19 through said individual controllers 17 (for stator 5) and 18 (for stator 6) in parallel with the possibility to function jointly and/or separately. The coils 9 of the winding 5 and the coils 13 of the winding 6 are made the same in transparent view, with the same sizes and configurations, so that the distances between the corresponding parts of said coils 9 and 13 are equal to the distance between the windings 5 and 6, which is the thickness of said additional layer 15 of electro-insulating material located between said windings 5 and 6 (their nearest coil layers 8 and 11), and working windings 5 and 6 consume the same power. Said coils 9 and 13 are etched in the metal layers of the printed circuit boards 20 and 21 of, accordingly, windings 5 and 6 before their connection in one common multilayer printed circuit board 16 with four said coil layers 7, 8, 11 and 12, two said layers 10 and 14 of an electro-insulating material and said additional layer 15 of an electro-insulating material. Each of said coil layers 7 and 8 forming common winding 5 comprises circumferentially arrayed pairs 22 of spiral coils 9; said coil layers are identically constructed (with the same sizes and configurations of coils) and are shifted angularly so that the center 23 of the start coil 24 of each said pair of coils 22 from layer 7 on one side of said layer of electro-insulating material 10 is electrically connected with the center 25 of the end coil 26 of each said pair of coils 22 from layer 8 on the other side of said layer 10 of electro-insulating material. Accordingly, each of said coil layers 11 and 12 forming common winding 6 comprises circumferentially arrayed pairs 22 of spiral coils 13; said coil layers are made with the same sizes and configurations and are shifted angularly so that the center 23 of the start coil 24 of each said pair of coils 22 from layer 11 on one side of said layer from an electro-insulating material 14 is electrically connected with the center 25 of the end coil 26 of each said pair of coils 22 from layer 12 on the other side of said layer 14 by an electro-insulating material. Said two coil layers 7 and 8 or (11 and 12) of the same winding 5 (or, accordingly, 6) are electrically connected by internal vias 27 and 28 which are reach-through holes plated with high electro-conducting material, forming cylinders 29 and 30 accordingly around each said via 27 or 28. Each said cylinder 29 of high electro-conducting material is located in contact with coils 9 of two coil layers 7 and 8 of the same winding 5 and is electrically isolated from the rest of coils (coils 13 of the winding 6), so each said via 27 is connecting only two said layers 7 and 8 of the same winding 5. Accordingly, each said cylinder 30 of high electro-conducting material is located in contact with coils 13 of two coil layers 11 and 12 of the same winding 6 and is electrically isolated from the remaining coils (coils 9 of the winding 5), so each said via 28 connects only two said layers 11 and 12 of the same winding 6. So, to connect all coil layers 7 and 8, and 11 and 12 each location for connecting matching pairs 22 of coils of different layers has a number of said vias equal to the number of windings forming the said multi-layer printed circuit board. In this particular case each of such locations has two vias 27 and 28, one of which connects coil layers 7 and 8 of winding 5, and another one that connects layers 11 and 12 of winding 6. FIG. 5a shows that the windings 5 and 6 and additional layer 15 of an electro-insulating material—do not have vias: said vias are made after connecting said windings in said common multi-layer printed circuit board 16.

In the second embodiment (FIGS. 7–9) the electric drive 1 comprises a magnetic rotor 2 with an axis of rotation 3 and a stator 4 having two groups of windings located on opposite sides from the rotor 2: one group from two described windings 5 and 6 and another group from two windings 5a and 6a located on the other side of the rotor 2. The windings 5a and 6a are fabricated as parts of a common multi-layer printed circuit board 16a that is identical to multi-layer printed circuit board 6,—the windings 5, 6, 5a and 6a are identical: they have the same configurations and sizes of coils, and in both said groups of windings the coil layers belonging to the different windings 5a and 6a are separated only by an additional layer of electro-insulating material (not shown—all particulars are the same as shown on FIGS. 2–5A). The windings 5, 6, 5a, and 6a are electrically connected through their controllers, 17, 18, 17a, and 18a accordingly, in parallel—with the possibility to function jointly and/or independently, and each of said windings (5, 6, 5a, and 6a) is electrically connected through its respective controller (17, 18, 17a and 18a) to the variable power source. In the variant illustrated on FIG. 8, all windings 5, 6, 5a, and 6a are electrically connected with a common variable power source 31, and in the variant illustrated on FIG. 9, each of said windings (5, 6, 5a, and 6a) is electrically connected to an individual variable power source 32, 33, 34, and 35, respectively.

The operation of the electric drive by the present invention is substantially similar to the operation described in said WO patent application WO No 03/003547 A1 (PCT/US 02/20224) "Brushless DC Electric Motor" (or the U.S. patent application Ser. No. 10/183,032 for this BRUSHLESS DC ELECTRIC MOTOR)—for the same Assignee.

The electric drive (FIGS. 1–6) operates in the following way. When electric power is supplied to the windings 5 and 6 of the electric drive 1, alternate electromagnetic fields are created. These electromagnetic fields interact with a magnetic field created by the magnetic means of the rotor 2. As a result, the rotor 2 is rotated with respect to the axis of rotation 3. Connecting of said windings 5 and 6 in parallel, with the possibility to function jointly and/or independently, provides the possibility for using all said windings together until such time as one of them may not continue to operate, and using the remaining windings for driving the rotor 2—should one of the windings fail. By employing this redundancy schema, the reliability of this electric drive 1 is sufficiently high to permit operation of said electric drive with less power until replacement of disabled winding can be accomplished—but without using reserved windings (and thus without increasing its size). Variants depending on the actual situation are clearly possible: the electric drive can work with less power until replacement of the disabled winding can be accomplished, or power to the electric drive can be increased to the previous level by employment of at least one variable power source. The electromagnetic fields of the windings 5 and 6 also interact with one another, so that the total electromagnetic field created by windings 5 and 6, located very close to each other (as near as possible, limited only by the thickness of the necessary layer of electro-insulating material)—is stronger than the sum of electromagnetic fields created by said windings when they are located at a larger distance one from another, and the number of coils and coil layers is the maximum possible within the same volume. As a result, efficiency of the electric drive is higher than in known electric drives.

Figure 9:
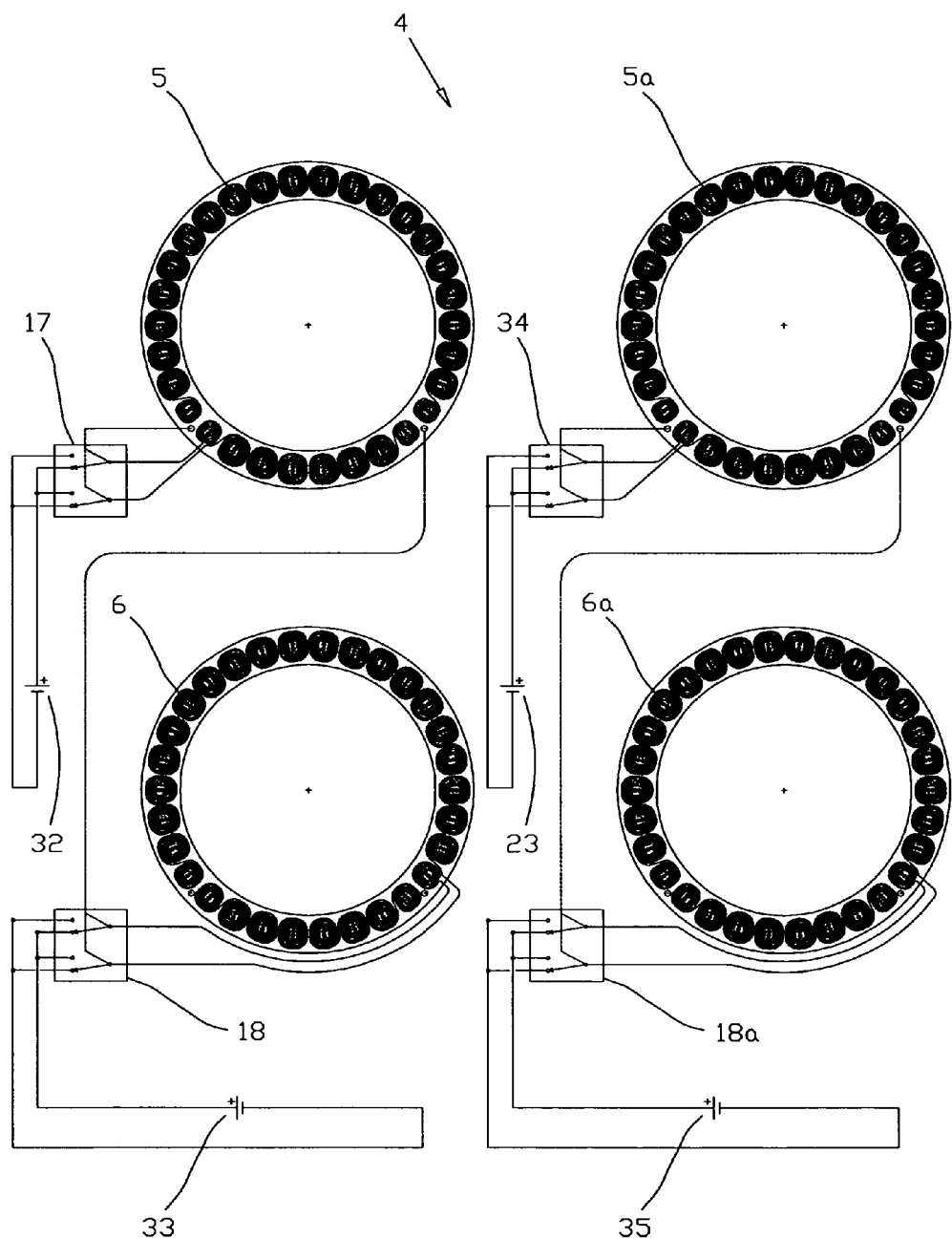
FIG. 9 is the same view but with four individual power sources.

The electric drive 1 of second embodiment (FIGS. 7–9) operates in essence the same way. The primary difference is that electric power is supplied to the all four stators 4, 5, 4a, and 5a of the electric drive 1. Connecting said windings 5, 6, 5a, and 6a in parallel, with the possibility to function jointly and/or independently, also provides the possibility for using all said windings together until such time as one of them may not continue to function, and using the remaining windings for driving the rotor 2 after one of them has failed. In this case the total power drawn by the remaining windings (after one of them has failed)—can be increased to the previous power level that all four windings 5, 6, 5a, and 6a together) were drawing before the failure—by one common variable power source 31 (FIG. 8), or by individual variable power sources 32, 33, 34, and 35 (FIG. 9). Because the windings 5, 6, 5a, and 6a have the same configurations and sizes of coils, they accordingly draw the same power when operating together—so each of them can simultaneously function as a main winding and/or as an additional reserved winding. The maximum possible common power of all said windings exceeds the minimum power required for normal operation of the electric drive. The variable power source 31 or variable power sources (32, 33, 34, and 35) allow the possibility to have the nominal common power necessary for normal work of the electric drive, even under the adverse condition of a failed winding. When all four windings are functioning normally, each of them draws one quarter from said common power. In the event of failure of one of the said windings, the output of the power source 31 or of three of the four individually variable power sources (32, 33, 34, and 35) that continue to supply power after the failure of one of said windings (5, 6, 5a, or 6a)—is increased, and thus the electric drive can continue normal operation because the power supplied to said three working windings is sufficient for the drive to function normally. Because the windings 5, 6, 5a and 6a are made identical and consume the same power when operating together, so In case of failure of any one of them, full design power should nevertheless be drawn on the same volume. In this case each of the remaining three windings is supplying one third of said common power, equaling the minimum necessary power required for normal operation of the electric drive. In this way the reliability of this electric drive 1 is sufficiently high to provide operation of said electric drive without using additional reserved windings (which do not operate unless one of the main windings fails)—and thus the size of the electric drive 1 can be decreased. In this variant, not only the electromagnetic fields of the windings 5 and 6, but also electromagnetic fields of the windings 5a and 6a—interact one with another creating a common electromagnetic field stronger than the sum of the electromagnetic fields created by said windings 5, 6, 5a, and 6a. As the tests show, the efficiency of the electric drive 1 will in this case be higher than in known electric drives, so its sizes can be additionally decreased.

The totality of said features yields the possibility for further decreasing in overall sizes of electric drives of this, the most compact, type of such drives (with ring-shaped windings, and especially with printed circuit boards)—providing high reliability without additional reserved windings, enhanced efficiency, and superior design of multi-layer printed circuit boards with two or more windings.

We claim:

1. An electric drive comprising a stator with at least two ring-shape windings and controllers and a magnetized rotor with an axis of rotation, wherein:
   (i) each of said windings comprises at least one coil layer with circumferentially arrayed coils located around said axis and a layer of electro-insulating material, and each winding is electrically connected with a power source through individual controller;
   (ii) at least two said windings are electrically connected by their controllers in parallel, with the possibility to function jointly and/or independently;
   (iii) at least two nearest windings are located in such a way that two said coil layers, belonging to different windings, are separated by an additional layer of electro-insulating material.

2. The electric drive as claimed in claim 1, wherein the coils of said nearest coil layers of different windings are made the same in transparent view so that the distances between corresponding parts of said coils of said nearest windings are equal to the thickness of said additional layer of electro-insulating material.

3. The electric drive as claimed in claim 1, wherein each of said windings is made as a printed circuit board with printed coils.

4. The electric drive as claimed in claim 3, wherein said coils are etched in circuit board metal layers.

5. The electric drive as claimed in claim 3, wherein at least two said nearest windings are made as parts of a common multi-layer printed circuit board.

6. The electric drive as claimed in claim 5, wherein each of said windings comprises two electrically connected coil layers located on the opposite sides of said layer of electro-insulating material, and thus said common multi-layer printed circuit board comprises at least four coil layers.

7. The electric drive as claimed in claim 6, wherein each of said coil layers forming common winding comprises circumferentially arrayed pairs of spiral coils, said coil layers are made with the same sizes and configurations of coils and are shifted angularly so that the center of the start coil of each said pair of coils from one side of said layer of electro-insulating material is electrically connected with the center of the end coil of each said pair of coils on the other side of said layer of electro-insulating material.

8. The electric drive as claimed in claim 7, wherein said coil layers are electrically connected by internal vias, which are reach-through holes plated with high electro-conducting material forming a cylinder around each said via.

9. The electric drive as claimed in claim 8, wherein each said cylinder from high electro-conducting material is located in contact with coils of two coil layers of the same winding and is electrically isolated from remaining coils so that each said via is connecting only two said layers of the same winding, and each location for connecting respective pairs of coils of different layers has a number of said vias equal to the number of windings forming said multi-layer printed circuit board.

10. The electric drive as claimed in claim 1, further comprising at least two groups of windings located on opposite sides from said rotor, each of said groups comprises said at least two windings, and in each of said groups said coil layers belonging to the different windings are separated by an additional layer of electro-insulating material.

11. The electric drive as claimed in claim 1, wherein said power source is made variable, with the possibility to increase power of the remaining said windings when at least one of them cannot continue to function, and the resultant power supplied to the remaining functioning windings is sufficient to yield normal operation of the electric drive.

12. The electric drive as claimed in claim 11, wherein all said windings are made identical so that they have the same power consumption.

13. The electric drive as claimed in claim 1, wherein said windings are connected by their controllers to one common power source.

14. The electric drive as claimed in claim 1, wherein each of said windings is connected by its controller to an individual power source.

15. The method of using of the electric drive claimed in claim 1, including permanent turning on of all said windings, and operating with less power when one of said windings cannot function until it has been replaced.

16. The method of using of the electric drive claimed in claim 11, including permanent turning on of all said windings and increasing the power of the remaining said windings to the level required for normal operation of the electric drive when at least one of them cannot continue normal functioning.

* * * * *